(12) United States Patent
Beaujot

(10) Patent No.: US 10,681,858 B2
(45) Date of Patent: Jun. 16, 2020

(54) REMOVING OPENER FORCE TO REDUCE SOIL DISTURBANCE

(71) Applicant: SEEDMASTER MANUFACTURING LTD., Emerald Park (CA)

(72) Inventor: Norbert Beaujot, Emerald Park (CA)

(73) Assignee: SEEDMASTER MANUFACTURING LTD., Saskatchewan (CA)

( * ) Notice: Subject to any disclaimer, the term of this patent is extended or adjusted under 35 U.S.C. 154(b) by 303 days.

(21) Appl. No.: 15/866,522

(22) Filed: Jan. 10, 2018

(65) Prior Publication Data

US 2018/0199505 A1    Jul. 19, 2018

(30) Foreign Application Priority Data

Jan. 18, 2017  (CA) ..................................... 2955462

(51) Int. Cl.
| | |
|---|---|
| A01C 7/08 | (2006.01) |
| A01C 7/20 | (2006.01) |
| A01C 5/06 | (2006.01) |
| A01C 21/00 | (2006.01) |

(52) U.S. Cl.
CPC .............. *A01C 7/088* (2013.01); *A01C 5/062* (2013.01); *A01C 7/081* (2013.01); *A01C 7/201* (2013.01); *A01C 7/205* (2013.01); *A01C 21/005* (2013.01)

(58) Field of Classification Search
CPC ......... A01C 5/062; A01C 7/081; A01C 7/088; A01C 7/205; A01C 7/201; A01C 7/102; A01C 21/005
See application file for complete search history.

(56) References Cited

U.S. PATENT DOCUMENTS

| | | | | |
|---|---|---|---|---|
| 2,670,699 A | * | 3/1954 | Kriegbaum | A01C 7/10 111/67 |
| 2,687,702 A | * | 8/1954 | Harper | A01B 63/28 111/67 |

(Continued)

FOREIGN PATENT DOCUMENTS

| | | |
|---|---|---|
| CA | 2 591 379 | 12/2008 |
| CA | 2 650 340 | 4/2009 |
| CA | 2 902 922 | 3/2016 |

OTHER PUBLICATIONS

Canadian Office Action dated Feb. 5, 2018 for CA Application No. 2,955,462.

*Primary Examiner* — Alicia Torres

(74) *Attorney, Agent, or Firm* — Nixon & Vanderhye P.C.

(57) ABSTRACT

An agricultural seeder has furrow opener assemblies spaced along a width of the implement frame. Each furrow opener assembly has an opener arm pivotally attached to the implement frame, and a furrow opener attached to the opener arm. A product delivery system delivers agricultural products to the furrow opener assemblies, and a product control controls the product delivery system such that agricultural products are delivered only to active furrow opener assemblies. A bias force system is operative, when activated in a transport mode, to exert an upward bias force on the active and idle furrow opener assemblies, and operative, when activated in an operating mode, to exert a downward bias force on the active furrow opener assemblies, and to exert substantially no force on the idle furrow opener assemblies.

19 Claims, 4 Drawing Sheets

(56) References Cited

U.S. PATENT DOCUMENTS

| | | | | |
|---|---|---|---|---|
| 2,711,903 A | * | 6/1955 | Harper | A01C 19/00 |
| | | | | 222/139 |
| 2,943,584 A | * | 7/1960 | Palmer | A01C 23/006 |
| | | | | 111/67 |
| 4,137,853 A | * | 2/1979 | Peterson | A01C 15/005 |
| | | | | 111/191 |
| 7,690,440 B2 | | 4/2010 | Dean et al. | |
| 8,578,870 B2 | | 11/2013 | Beaujot | |
| 2008/0093093 A1 | * | 4/2008 | Sheppard | A01B 61/046 |
| | | | | 172/2 |
| 2010/0096149 A1 | * | 4/2010 | Friggstad | A01C 5/064 |
| | | | | 172/574 |
| 2015/0208571 A1 | * | 7/2015 | Hahn | F15B 15/202 |
| | | | | 172/1 |
| 2017/0064902 A1 | * | 3/2017 | Jagow | A01C 7/04 |

\* cited by examiner

REMOVING OPENER FORCE TO REDUCE SOIL DISTURBANCE

This application claims priority to CA Patent Application No. 2,955,462 filed 18 Jan. 2017, the entire contents of which is hereby incorporated by reference.

This disclosure relates to the field of agricultural seeding implements and in particular a system for reducing soil disturbance in overlap areas of a field.

BACKGROUND

It is well known in the agricultural industry that applying agricultural products such as seed and fertilizer to field areas where the agricultural products have already been applied in a previous pass over the area by the implement is undesirable and various equipment and systems have been developed for reducing the size of these overlap areas. Wider seeding implement now commonly have sectional control systems whereby the delivery of agricultural products to sections of the implement that are in overlap areas is stopped, and then restarted when the sections move back into unseeded field areas.

When product flow to overlap areas is stopped however, the furrow openers remain engaged in the ground disturbing the products that were placed in the previous pass. Seeds are particularly sensitive to such disturbance as it is desirable to press the seeds into close contact with moist soil to promote germination, and so disturbance by a subsequent pass of the engaged furrow openers is detrimental to germination and eventual crop yield.

This problem of disturbance is addressed in U.S. Pat. No. 7,690,440 to Dean, et al. which discloses a seeding implement with furrow openers attached to mounting arms that are movable from a raised transport position to a lowered operating position. The mounting arms and attached furrow openers are laterally spaced across the width of the implement and divided into laterally adjacent sections. A sectional control system stops the flow of agricultural products to sections that are in an overlap area, and also automatically raises the mounting arms in the section to the raised transport position when the flow of agricultural products to the furrow openers in the section is stopped. When the furrow openers in a section are raised, the drag forces exerted by the implement become unbalanced as drag forces are reduced on the raised side compared to the side not raised and so the implement moves forward at a slight angle. This skewed orientation changes the row spacing of the seeded crop and can adversely affect yields.

U.S. Pat. No. 8,578,870 to the present inventor Beaujot addresses the problem of disturbing previously planted seeds by mapping a field to determine overlap areas prior to seeding, and then stopping application of the agricultural products on the first pass of the seeding implement through the overlap area and then applying the products on the second, and final, pass through the overlap area. Skewing is avoided since all the furrow openers always remain in the ground, and are raised and lowered together.

SUMMARY OF THE INVENTION

The present disclosure provides an agricultural seeding apparatus that overcomes problems in the prior art.

In a first embodiment the present disclosure provides an agricultural seeding apparatus comprising an implement frame mounted on wheels for travel over a ground surface in an operating travel direction, with a plurality of furrow opener assemblies spaced along a width of the implement frame. Each furrow opener assembly comprises an opener arm attached to the implement frame such that the opener arm is movable up and down, and a furrow opener attached to the opener arm. A product delivery system is operative to deliver agricultural products to the furrow opener assemblies, and a product control is operative control the product delivery system such that agricultural products are delivered only to active furrow opener assemblies and such that no agricultural products are delivered to idle furrow opener assemblies. A bias force system is operative, when activated in a transport mode, to exert an upward bias force on the active and idle furrow opener assemblies, and operative, when activated in an operating mode, to exert a downward bias force on the active furrow opener assemblies, and to exert substantially no force on the idle furrow opener assemblies.

In a second embodiment the present disclosure provides a method of applying an agricultural product to a ground surface. The method comprises mounting an implement frame on wheels for travel over the ground surface in an operating travel direction; mounting a plurality of furrow opener assemblies spaced across a width of the implement frame, each furrow opener assembly comprising an opener arm attached to the implement frame such that the opener arm is movable up and down, and a furrow opener attached to the opener arm; providing a product delivery system; moving the implement frame in the operating travel direction along the ground surface from a starting location toward an ending location; as the implement frame begins to move along the ground surface, exerting a downward bias force on active furrow opener assemblies such that the furrow openers of the active furrow opener assemblies create furrows in the ground surface and activating the product delivery system to deliver agricultural products to the furrows created by the active furrow opener assemblies while delivering no agricultural products to idle furrow opener assemblies, and exerting substantially no force on the idle furrow opener assemblies; and when the implement frame reaches the ending location, deactivating the product delivery system to stop delivery of the agricultural products to the active furrow opener assemblies and exerting an upward bias force on the active and idle furrow opener assemblies such that the active and idle furrow opener assemblies move to a transport position where the furrow openers are above the ground surface.

In the apparatus and method of the present disclosure when a furrow opener assembly is active the hydraulic cylinder exerts the downward bias force which forces the furrow opener down into the ground surface and the packer wheel is forced downward on top of the furrow pushing the loosened soil downward such that the ground surface on which the packer wheel rolls is slightly lower than the soil surface in front of the furrow opener.

When a furrow opener assembly is idle with no downward or upward force exerted thereon the packer wheel simply rolls lightly along the ground surface and the furrow opener penetrates the ground surface to a depth that is somewhat less than the depth of the furrow created when the furrow opener assembly is active and the hydraulic cylinder is forcing the furrow opener downward. Thus when the idle furrow opener assemblies pass over an overlap area where seeds have been placed at the depth of the furrow, the furrow openers are generally somewhat above the seeds. Soil disturbance is much reduced compared to the prior art where all the furrow openers are pushed downward whether they are dispensing agricultural products or not and so pass through the overlap areas at about the same depth as the previously planted seeds.

Compared to the prior art where the furrow openers that are not dispensing agricultural products are raised to the transport position, the power requirements of the hydraulic system are much reduced since there is no pressurized hydraulic fluid required for furrow opener assemblies that are idle. The hydraulic system is also somewhat simpler since no differentiation is made between active and idle furrow opener assemblies and pressurized hydraulic fluid is simply directed into the first ports of all the hydraulic cylinders.

Further since the furrow openers and packer wheels still exert some drag forces when idle the degree to which drag forces are unbalanced, and thus the degree of skewing, is at least somewhat reduced.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
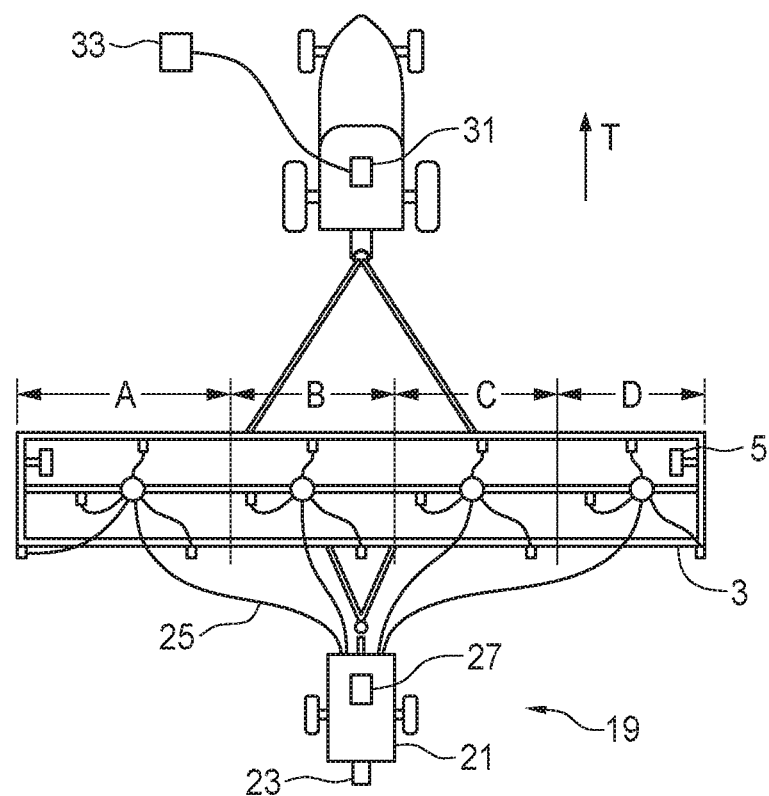
FIG. 1 is a schematic top view of an embodiment of the agricultural seeding apparatus of the present disclosure connected to a towing tractor.
Figure 2:
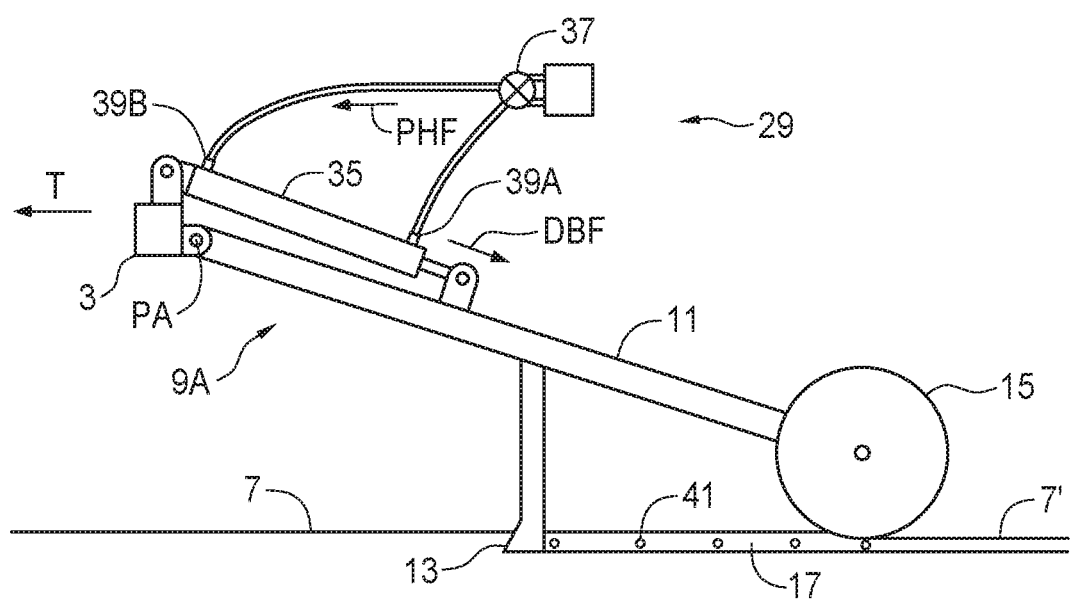
FIG. 2 is a schematic side view of an active furrow opener assembly of the embodiment of FIG. 1 engaged in the ground surface and creating a furrow.

FIGS. 1-4 schematically illustrate an embodiment of an agricultural seeding apparatus 1 of the present disclosure. The apparatus 1 comprises an implement frame 3 mounted on wheels 5 for travel over a ground surface 7 in an operating travel direction T. A plurality of furrow opener assemblies 9 is spaced along a width of the implement frame 3. Each furrow opener assembly 9 comprises, as schematically illustrated in FIG. 2, an opener arm 11 pivotally attached to the implement frame at pivot axis PA such that the opener arm 11 is movable up and down, and a furrow opener 13 attached to the opener arm 11. In the illustrated furrow opener assemblies 9, a packer wheel 15 is rotatably mounted to each opener arm 11 rearward of the corresponding furrow opener 13 and configured to roll along a furrow 17 created by the corresponding furrow opener 13. In some furrow opener assemblies two separate furrow openers are used to create separate laterally spaced furrows, and the packer wheel is typically wide enough to roll along the top of both furrows.

A product delivery system 19 comprises a conventional product tank 21, fan 23, and conduit network 25. The agricultural products are metered from the product tank 21 into the conduit network 25 and an air stream provided by the fan 23 carries the agricultural products through the conduit network 25 to the furrow opener assemblies 9.

In the illustrated apparatus 1 the furrow opener assemblies 9 are arranged in laterally adjacent opener sections A, B, C, D across the width of the implement frame 3 as is known in the art for providing sectional control to avoid excessive overlap.

As is known in the art a product control 27 is operative control the product delivery system 19 so that agricultural products are delivered only to those furrow opener assemblies 9 that are determined to be active, and such that no agricultural products are delivered to furrow opener assemblies 9 that are determined to be idle, typically those that are in overlap areas.

Figure 3:
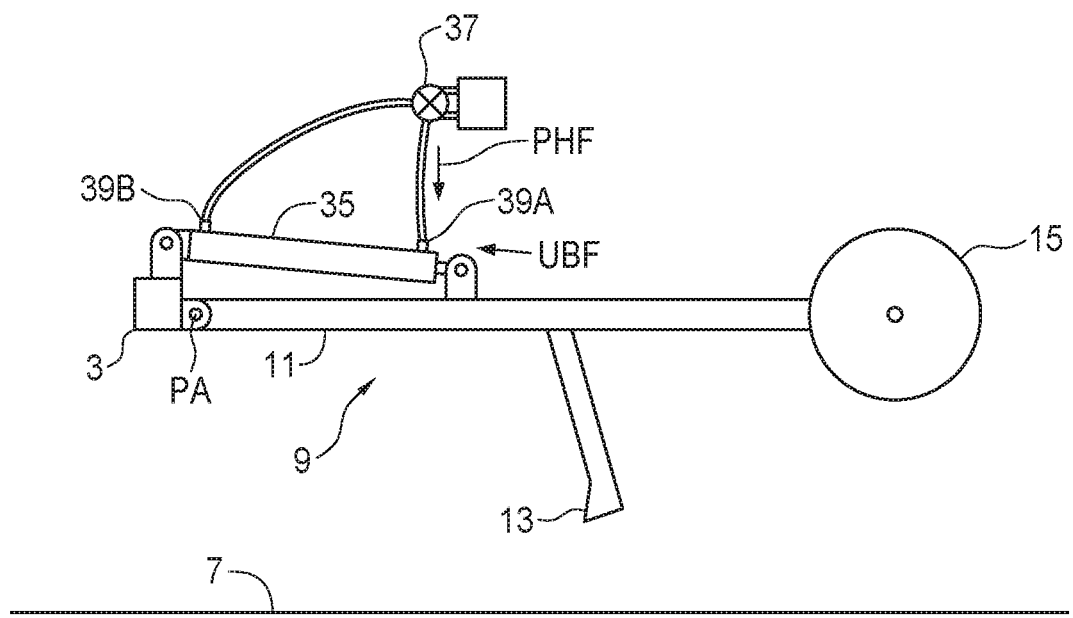
FIG. 3 is a schematic side view of an active or idle furrow opener assembly of the embodiment of FIG. 1 in a transport position above the ground surface.

A bias force system 29 is operative to exert selected forces on the opener arms 11 of the furrow opener assemblies 9. When activated in a transport mode, the bias force system 29 exerts an upward bias force UBF on all the furrow opener assemblies 9, both active and idle. FIG. 3 schematically illustrates the position of the furrow opener assemblies 9 when the bias force system 29 is activated in the transport mode with the furrow openers 13 above the ground surface 7.

Figure 4:
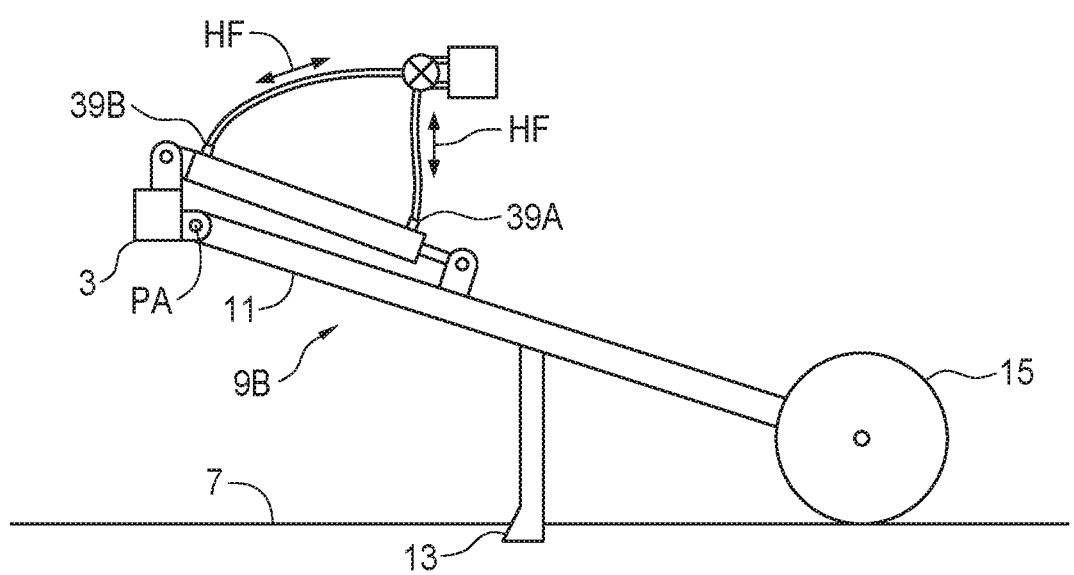
FIG. 4 is a schematic side view of an idle furrow opener assembly of the embodiment of FIG. 1 with the packer wheel thereof rolling along the ground surface and the furrow opener moving through the soil at a shallow depth.

The bias force system 29 is further operative, when activated in an operating mode, to exert a downward bias force DBF on the active furrow opener assemblies 9A seen in FIG. 2, and to exert substantially no force on the idle furrow opener assemblies 9B seen in FIG. 4.

The product control 27 and bias force system 29 are controlled by a sectional control 31 that is operative to receive field location information from an external guidance system 33, using global positioning satellites or the like, and to determine which furrow opener assemblies 9 are active and which furrow opener assemblies 9 are idle according to the field location information. The sectional control 31 is operative to activate the product delivery system 19 to deliver agricultural products only to active furrow opener assemblies 9A, and to activate the bias force system 29 in the operating mode to exert the downward bias force DBF only on the active furrow opener assemblies 9A, and to exert substantially no force on the idle furrow opener assemblies 9B.

In the illustrated apparatus 1, the opener sections A, B, C, D are either active or idle, and wherein all the furrow opener assemblies 9 in the active opener sections are active furrow opener assemblies 9A and all the furrow opener assemblies 9 in the idle opener sections are idle furrow opener assemblies 9B.

The field location information includes an indication of overlap areas where at least some of the furrow opener assemblies 9 on a later pass will travel over an area of ground surface travelled over by the furrow opener assemblies 9 on an earlier pass. The sectional control 31 is operative to determine which opener sections are active and which opener sections are idle according to the field location information.

Figure 5:
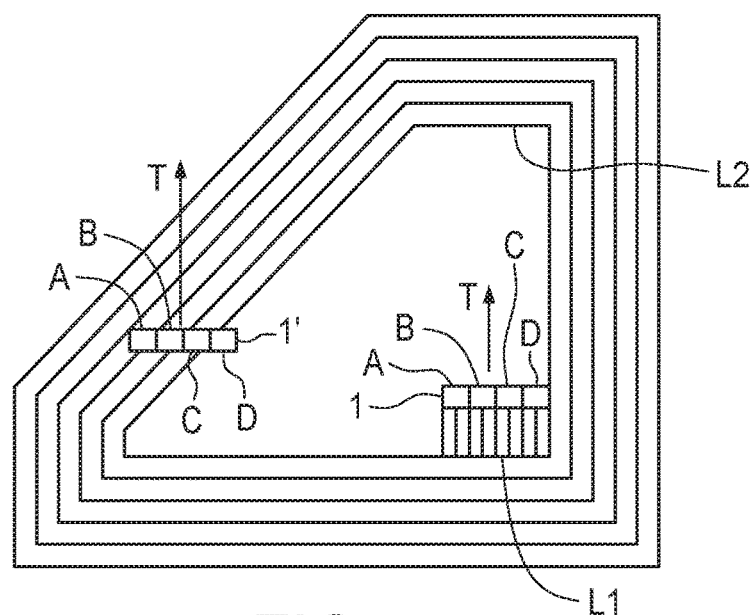
FIG. 5 is a schematic top view of a field with the embodiment of FIG. 1 shown in a position where all the furrow opener assemblies are active, and a different position where some furrow opener assemblies are active and some are idle.

FIG. 5 schematically illustrates the apparatus 1 in a field location where all the opener sections are active, and in an apparatus location 1' where opener sections A and B are entirely in an overlap area travelled over by the furrow opener assemblies 9 on an earlier pass. In a typical operation where the agricultural products are applied on the first pass through an overlap area, opener sections A and B are idle, and since opener section C is only partially in the overlap area section C remains active and opener section D is entirely outside the overlap area and is also active. Opener sections C and D will remain active until each is entirely in the overlap area.

Alternatively in an operation where the agricultural products are applied on the second pass through an overlap area, when in position 1' the opener sections A and B will be active, since on the first pass through the overlap area the appropriate opener sections were idle and no agricultural products were applied. Reducing the downward bias force DBF to zero on the first pass through the overlap area when no agricultural products are being applied leaves the soil at the depth where the seeds will be placed largely undisturbed, such that seed placement in firm soil is facilitated.

The sectional control 31 activates the product control 27 to deliver agricultural products only to active furrow opener assemblies 9B in active opener sections, and activates the bias force system 29 in the operating mode to exert the downward bias force DBF only on the active furrow opener assemblies 9A in the active opener sections, and to exert substantially no force on the idle furrow opener assemblies 9B in the idle opener sections.

In the illustrated apparatus 1 as schematically illustrated in FIGS. 2-4 the bias force system 29 comprises a plurality of hydraulic cylinders 35. A hydraulic cylinder 35 is connected between the opener arm 11 on each furrow opener assembly 9 and the implement frame 3.

A hydraulic control 37 is activated by the sectional control 31 and when activated in the transport mode is operative to direct pressurized hydraulic fluid PHF into first ports 39A of the hydraulic cylinders 35 to exert the upward bias force UPD on the furrow opener assemblies 9 as shown in FIG. 3. The hydraulic control 37 is operative, when activated in the operating mode, to direct pressurized hydraulic fluid PHF into second ports 39B of the hydraulic cylinders 35 to exert the downward bias force DBF on the active furrow opener assemblies 9A as seen in FIG. 2, and operative to allow hydraulic fluid HF to flow freely into and out of the first and second ports 39A, 39B to exert substantially no force on the idle furrow opener assemblies 9B.

The present disclosure provides a method of applying an agricultural product to a ground surface 7. The method comprises mounting an implement frame 3 on wheels 5, for travel over the ground surface 7 in an operating travel direction T; mounting a plurality of furrow opener assemblies 9 spaced across a width of the implement frame 3, each furrow opener assembly 9 comprising an opener arm 11 attached to the implement frame 3 such that the opener arm 11 is movable up and down, and a furrow opener 13 attached to the opener arm 11; providing a product delivery system 19; moving the implement frame 3 in the operating travel direction T along the ground surface 7 as seen in FIG. 5 from a starting location L1 toward an ending location L2; as the implement frame 3 begins to move along the ground surface 7, exerting a downward bias force DBF on active furrow opener assemblies 9A such that the furrow openers 13 of the active furrow opener assemblies 9A create furrows 17 in the ground surface 7 and activating the product delivery system 19 to deliver agricultural products to the furrows 17 created by the active furrow opener assemblies 9A while delivering no agricultural products to idle furrow opener assemblies 9B, and exerting substantially no force on the idle furrow opener assemblies 9B; and, when the implement frame 3 reaches the ending location L2, deactivating the product delivery system 19 to stop delivery of the agricultural products to the active furrow opener assemblies 9A and exerting an upward bias force UBF on the active and idle furrow opener assemblies 9A, 9B such that the active and idle furrow opener assemblies 9A, 9B move to a transport position where the furrow openers 13 are above the ground surface 7.

The method can comprise exerting the upward bias forces UBF on the furrow opener assemblies 9 by directing pressurized hydraulic fluid PHF into first ports 39A of hydraulic cylinders 35 connected between the implement frame 3 and the furrow opener assemblies 9, exerting the downward bias forces DBF on the furrow opener assemblies 9 by directing pressurized hydraulic fluid PHF into second ports 39B of the hydraulic cylinders 35, and exerting substantially no force on the furrow opener assemblies 9 by allowing hydraulic fluid HF to flow freely into and out of the first and second ports 39A, 39B.

The furrow opener 13 is located below the bottom edge of the packer wheel 15 at a distance that is typically adjustable and correlated to the desired depth of the furrow 17 and the desired depth of placement of the agricultural products. The major concern with furrow depth is where the agricultural product is seed, as it is desired to place the seed at a consistent depth and then pack same into close contact with moist soil to promote germination.

Thus in the apparatus and method of the present disclosure when a furrow opener assembly 9 is active, as schematically illustrated in FIG. 2, the hydraulic cylinder 35 exerts the downward bias force DBF which pushes the opener arm 11 down and forces the furrow opener 13 down into the ground surface 7 where same loosens the soil and creates a furrow 17. The packer wheel 15 is forced downward on top of the furrow 17 pushing the loosened soil downward such that the ground surface 7' where the bottom of the packer wheel 15 rolls is slightly lower than the soil surface 7 in front of the furrow opener 13.

When a furrow opener assembly 9 is idle, as schematically illustrated in FIG. 4, no downward or upward force is exerted on the opener arm 11 as the hydraulic cylinder 35 is in a float position where hydraulic fluid HF moves freely in and out of the first and second ports 39A, 39B as packer wheel 15 moves the opener arm 11 up and down in response to elevational changes in the ground surface. With no force on the opener arm 11 the packer wheel 15 simply rolls lightly along the ground surface 7 and the furrow opener 13 penetrates the ground surface to a depth that is somewhat less than the depth of the furrow 17 created when the furrow opener assembly is active and the hydraulic cylinder 35 is forcing the furrow opener 13 downward.

Figure 6:
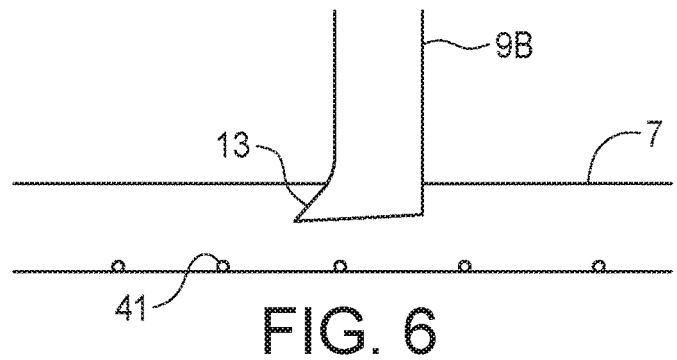
FIG. 6 is a schematic side view of an idle furrow opener assembly with the furrow opener thereof moving through the soil above previously placed seeds.

Thus as schematically illustrated in FIG. 6 when the idle furrow opener assemblies 9B pass over an overlap area where seeds 41 have been placed at the depth of the furrow 17, furrow openers 13 are generally somewhat above the seeds 41. While there is some soil disturbance same is much reduced compared to the prior art where all the furrow openers 13 are pushed downward whether they are dispensing agricultural products or not.

Figure 7:
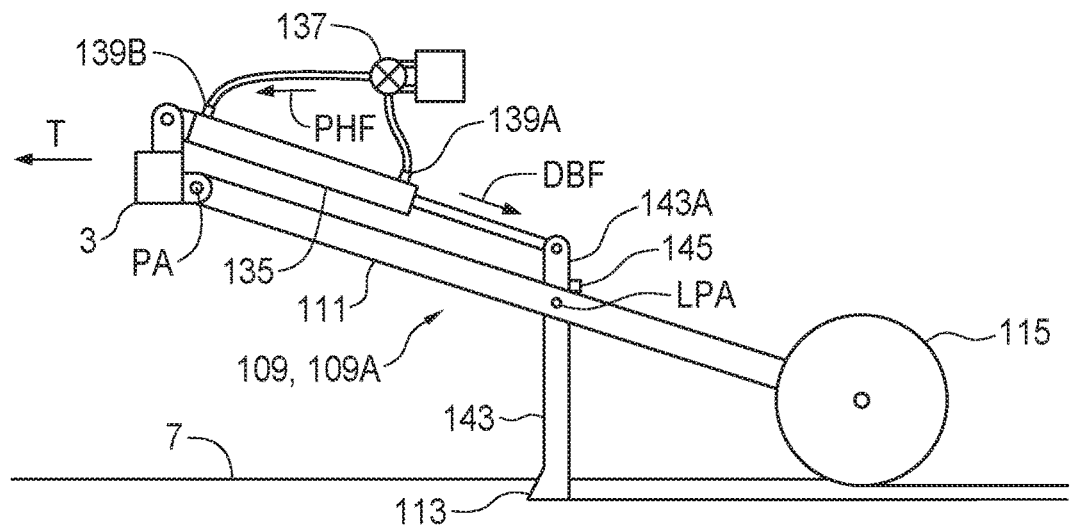
FIG. 7 is a schematic side view of an alternate furrow opener assembly where the alternate furrow opener assembly is active and engaged in the ground surface creating a furrow.
Figure 8:
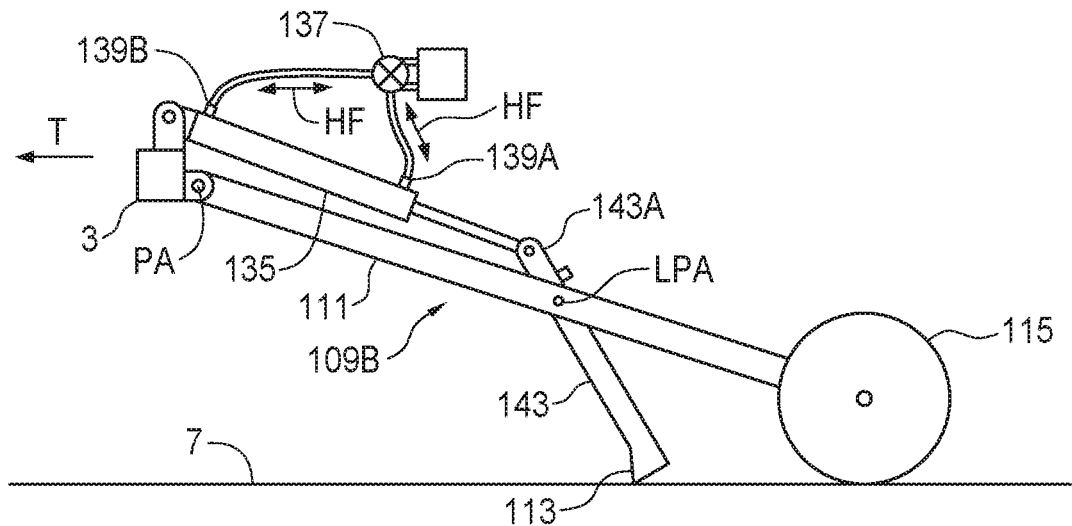
FIG. 8 is a schematic side view of the furrow opener assembly of FIG. 7 where the alternate furrow opener assembly is idle with the furrow opener dragging along the field surface.
Figure 9:
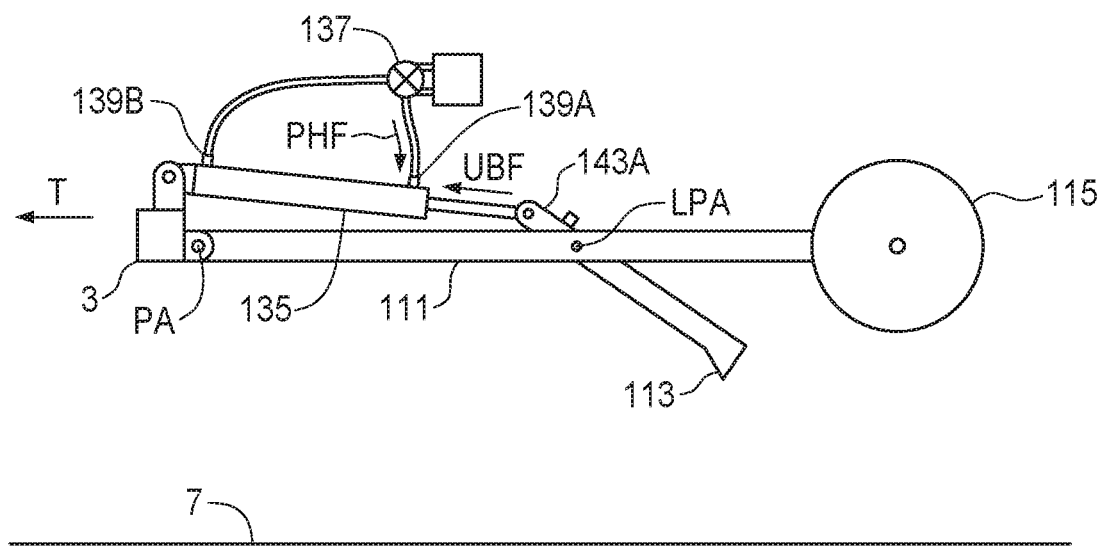
FIG. 9 is a schematic side view of the furrow opener assembly of FIG. 7 where the alternate furrow opener assembly is min a transport position above the field surface.

FIGS. 7-9 schematically illustrate an alternate type of furrow opener assembly 109 where use of the present disclosure further reduces disturbance of previously placed seeds. The furrow opener assembly 109 comprises an opener arm 111 pivotally attached to the implement frame 3 at pivot axis PA such that the opener arm 111 is movable up and down and a packer wheel 115 is rotatably mounted to the opener arm 111. The furrow opener 113 is attached to a bottom end of an opener leg 143 that is pivotally attached to the opener arm 111 forward of the packer wheel about a leg pivot axis LPA oriented substantially horizontal and perpendicular to the operating travel direction T such that the opener leg 143 extends downward from the opener arm 111. The hydraulic cylinder 135 is connected between the implement frame 3 and an upper portion 143A of the opener leg 143 above the leg pivot axis LPA and exerts the downward bias force DBF rearward on the upper portion 143A of the corresponding opener leg 143.

Thus when the furrow opener assembly 109A is active as shown in FIG. 7, the hydraulic control 137 is activated in the operating mode and directs pressurized hydraulic fluid PHF into second port 139B of the hydraulic cylinder 35 which exerts the downward bias force DBF rearward on the upper portion 143A of the opener leg 143 above the leg pivot axis LPA, causing the lower portion 143B of opener leg 143 to move forward until a block member 145 attached to the opener leg 143 bears against the opener arm 111, and the downward force is then transferred to the opener arm 111 and attached packer wheel 115, pushing them downward and forcing the furrow opener 113 into the ground surface 7.

When the furrow opener assembly 109B is idle as shown in FIG. 8, the hydraulic control 137 is activated in the operating mode to allow hydraulic fluid HF to flow freely in and out of the first and second ports 139A, 139B and so exert substantially no force on the idle furrow opener assembly 109B. With furrow opener assembly 109, when no force is exerted by the hydraulic cylinder 135 the furrow opener 113 does not remain below the bottom edge of the packer wheel 115 but is pushed rearward by the field surface 7 and simply drags along the field surface 7 barely penetrating the soil and passing above any previously planted seeds.

When the hydraulic control 137 is activated in the transport mode pressurized hydraulic fluid PHF is directed into the first port 139A of the hydraulic cylinder 135 and exerts the upward bias force UPD on the furrow opener assembly 109 as shown in FIG. 9 and raises the furrow opener 113 and opener arm 111 to the transport position shown. Thus the present disclosure significantly reduces disturbance of previously planted seeds. Also compared to the prior art where the furrow openers that are not dispensing agricultural products are raised to the transport position, the power requirements of the hydraulic system are much reduced since there is no pressurized hydraulic fluid required for furrow opener assemblies 9, 109 that are idle. The hydraulic system is also somewhat simpler since when exerting the upward bias force UBF to raise the furrow opener assemblies 9, 109 to the transport position no differentiation is made between active and idle furrow opener assemblies 9, 109 and pressurized hydraulic fluid PHF is simply directed into the first ports 39A, 139A of all the hydraulic cylinders 35, 135.

Further since the furrow openers 13, 113 and packer wheels 15, 115 still exert some drag forces when idle the degree to which drag forces are unbalanced, and thus the degree of skewing, is at least somewhat reduced.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural seeding apparatus comprising:
   an implement frame mounted on wheels for travel over a ground surface in an operating travel direction;
   a plurality of furrow opener assemblies spaced along a width of the implement frame, each furrow opener assembly comprising an opener arm attached to the implement frame such that the opener arm is movable up and down, and a furrow opener attached to the opener arm;
   a product delivery system operative to deliver agricultural products to the furrow opener assemblies;
   a product control operative to control the product delivery system such that agricultural products are delivered only to active furrow opener assemblies and such that no agricultural products are delivered to idle furrow opener assemblies;
   a bias force system operative, when activated in a transport mode, to exert an upward bias force on the active and idle furrow opener assemblies;
   the bias force system further operative, when activated in an operating mode, to exert a downward bias force on the active furrow opener assemblies, and to exert substantially no force on the idle furrow opener assemblies such that the idle furrow opener assemblies move up and down freely.

2. The apparatus of claim 1 wherein the bias force system comprises a plurality of hydraulic cylinders and a hydraulic control operative to direct pressurized hydraulic fluid into first ports of the hydraulic cylinders to exert the upward bias force on the furrow opener assemblies and operative to direct pressurized hydraulic fluid into second ports of the hydraulic cylinders to exert the downward bias force on the furrow opener assemblies, and operative to allow hydraulic fluid to flow freely into and out of the first and second ports to exert substantially no force on the furrow opener assemblies.

3. The apparatus of claim 2 wherein one of the hydraulic cylinders is connected between each furrow opener assembly and the implement frame.

4. The apparatus of claim 3 comprising a packer wheel rotatably mounted to each opener arm rearward of the corresponding furrow opener and configured to roll along a furrow created by the corresponding furrow opener.

5. The apparatus of claim 4 wherein each furrow opener is attached to a bottom end of an opener leg pivotally attached to the opener arm forward of the packer wheel about a leg pivot axis oriented substantially horizontal and perpendicular to the operating travel direction such that the opener leg extends downward from the opener arm, and wherein each hydraulic cylinder is connected between the implement frame and an upper portion of the corresponding opener leg above the leg pivot axis and exerts the downward bias force rearward on the upper portion of the corresponding opener leg.

6. The apparatus of claim 1 comprising a sectional control operative to receive field location information from an external guidance system and to determine which furrow opener assemblies are active and which furrow opener assemblies are idle according to the field location information, and operative to activate the product delivery system to deliver agricultural products only to active furrow opener assemblies, and to activate the bias force system in the operating mode to exert the downward bias force only on the active furrow opener assemblies, and to exert substantially no force on the idle furrow opener assemblies.

7. The apparatus of claim 6 wherein the field location information includes an indication of overlap areas where at least some of the furrow opener assemblies on a later pass will travel over an area of ground surface travelled over by the furrow opener assemblies on an earlier pass.

8. The apparatus of claim 6 wherein the furrow opener assemblies are arranged in laterally adjacent opener sections across the width of the implement frame, and wherein the opener sections are either active or idle, and wherein all the furrow opener assemblies in the active opener sections are active furrow opener assemblies and all the furrow opener assemblies in the idle opener sections are idle furrow opener assemblies.

9. The apparatus of claim 8 wherein the sectional control is operative to determine which opener sections are active and which opener sections are idle according to the field location information, and operative to activate the product delivery system to deliver agricultural products only to active furrow opener assemblies in active opener sections, and to activate the bias force system in the operating mode to exert the downward bias force only on the active furrow opener assemblies in the active opener sections, and to exert substantially no force on the idle furrow opener assemblies in the idle opener sections.

10. A method of applying an agricultural product to a ground surface, the method comprising:
   mounting an implement frame on wheels for travel over the ground surface in an operating travel direction;
   mounting a plurality of furrow opener assemblies spaced across a width of the implement frame, each furrow opener assembly comprising an opener arm attached to the implement frame such that the opener arm is movable up and down, and a furrow opener attached to the opener arm;
   providing a product delivery system;
   moving the implement frame in the operating travel direction along the ground surface from a starting location toward an ending location;
   as the implement frame begins to move along the ground surface, exerting a downward bias force on active furrow opener assemblies such that the furrow openers of the active furrow opener assemblies create furrows in the ground surface and activating the product delivery system to deliver agricultural products to the furrows created by the active furrow opener assemblies while delivering no agricultural products to idle furrow opener assemblies, and exerting substantially no force on the idle furrow opener assemblies such that the idle furrow opener assemblies move up and down freely; and
   when the implement frame reaches the ending location, deactivating the product delivery system to stop delivery of the agricultural products to the active furrow opener assemblies and exerting an upward bias force on the active and idle furrow opener assemblies such that the active and idle furrow opener assemblies move to a transport position where the furrow openers are above the ground surface.

11. The method of claim 10 comprising exerting the upward bias forces on the furrow opener assemblies by directing pressurized hydraulic fluid into first ports of hydraulic cylinders connected between the implement frame and the furrow opener assemblies, exerting the downward bias forces on the furrow opener assemblies by directing pressurized hydraulic fluid into second ports of the hydraulic cylinders, and exerting substantially no force on the furrow opener assemblies by allowing hydraulic fluid to flow freely into and out of the first and second ports.

12. The method of claim 11 comprising connecting one of the hydraulic cylinders between the opener arm on each furrow opener assembly and the implement frame.

13. The method of claim 12 comprising rotatably mounting a packer wheel to each opener arm rearward of the corresponding furrow opener such that the packer wheel rolls along a furrow created by the corresponding furrow opener.

14. The method of claim 13 comprising attaching each furrow opener to a bottom end of an opener leg, and attaching each opener leg to the opener arm forward of the packer wheel about a leg pivot axis oriented substantially horizontal and perpendicular to the operating travel direction such that the opener leg extends downward from the opener arm, and connecting each hydraulic cylinder to the opener arm by connecting each hydraulic cylinder between the implement frame and an upper portion of the corresponding opener leg above the leg pivot axis and exerting the downward bias force rearward on the upper portion of the corresponding opener leg.

15. The method of claim 10 comprising, as the implement moves along the ground surface, receiving field location information from an external guidance system and determining which furrow opener assemblies are active and which furrow opener assemblies are idle according to the field location information.

16. The method of claim 15 wherein the field location information includes an indication of overlap areas where at least some of the furrow opener assemblies on a later pass will travel over an area of ground surface travelled over by the furrow openers on an earlier pass.

17. The method of claim 15 comprising arranging the furrow opener assemblies in laterally adjacent opener sections across the width of the implement frame, and wherein the opener sections are either active or idle, and wherein all the furrow opener assemblies in the active opener sections are active furrow opener assemblies and all the furrow opener assemblies in the idle opener sections are idle furrow opener assemblies.

18. The method of claim 17 comprising determining which opener sections are active and which opener sections are idle according to the field location information, and activating the product delivery system to deliver agricultural products only to the active furrow opener assemblies in the active opener sections, and exerting the downward bias force only on the active furrow opener assemblies in the active opener sections, and exerting substantially no force on the idle furrow opener assemblies in the idle opener sections.

19. A method of applying an agricultural product to a ground surface, the method comprising:
   mounting an implement frame on wheels for travel over the ground surface in an operating travel direction;
   mounting a plurality of furrow opener assemblies spaced across a width of the implement frame, each furrow opener assembly comprising an opener arm attached to the implement frame such that the opener arm is movable up and down, and a furrow opener attached to the opener arm;

moving the implement frame in the operating travel direction along the ground surface from a starting location toward an ending location;

as the implement frame begins to move along the ground surface, exerting a downward bias force on active furrow opener assemblies such that the furrow openers of the active furrow opener assemblies create furrows in the ground surface and activating for delivering agricultural products to the furrows created by the active furrow opener assemblies while delivering no agricultural products to idle furrow opener assemblies, and exerting substantially no force on the idle furrow opener assemblies such that the idle furrow opener assemblies move up and down freely; and when the implement frame reaches the ending location, deactivating to stop delivery of the agricultural products to the active furrow opener assemblies and exerting an upward bias force on the active and idle furrow opener assemblies such that the active and idle furrow opener assemblies move to a transport position where the furrow openers are above the ground surface.

* * * * *